Feb. 24, 1970     P. McGILL     3,496,601

FEEDER FOR AUGER-TYPE EXTRUDER

Filed April 14, 1967

INVENTOR
PAUL McGILL
BY

ATTORNEY

United States Patent Office 3,496,601
Patented Feb. 24, 1970

3,496,601
FEEDER FOR AUGER-TYPE EXTRUDER
Paul McGill, Neshanic Station, N.J., assignor to Midland-Ross Corporation, a corporation of Ohio
Filed Apr. 14, 1967, Ser. No. 631,052
Int. Cl. B29f *3/00*
U.S. Cl. 18—12    7 Claims

ABSTRACT OF THE DISCLOSURE

A feeder for an extruder of thermoplastic materials adapted to feed therethrough a particulate low-density material utilizing a tapered screw member disposed in concentric and spaced rotation with a downward tapering hopper so as to induce or permit by-pass currents of compacted material in excess of that which will pass through a lower throat duct of the feeder.

Description

In one field of manufacturing extruded products from thermoplastic materials, thermoplastic scrap is processed into finely divided, high-bulk, low-density condition adapting it for re-use as a supply source for auger-type extruders. For example, scrap polyethylene is reclaimable as a supply material for extruders if it is shredded, cut, or ground to small particle size.

In feeding such small-particle scrap to an extruder by conventional feeding devices, difficulties are encountered such as (1) inability for the usually small screw which feeds directly into the extruder to transfer sufficient material to maintain full loading of the extruder; (2) tendency of the load carried in the feeder hopper to rotate with the feeder screw; (3) overloading the feeder screw within the hopper throat with consequent plugging; and (4) excessive consumption of power as the result of overloading the feeder screw portion discharging directly into the extruder from the hopper throat.

Hence, an object of the invention is to provide an extruder feeder for high-bulk potentially-plastic materials, such as film scrap and flake regrinds, by which such high-bulk material may be fed at poundage rates approximately equal to those obtained in feeding pellets of new plastic material.

Another object is to provide an extruder feeder capable of feeding high-bulk materials at uniform poundage rates with freedom from excesses or shortages in delivery, excessive power consumption, and over-stresses on equipment such as those caused by congestion or choking at the throat of a conventional feeder.

These and other objects are achieved in a feeder comprising a hopper tapering downwardly to a central outlet opening, and a compacting screw supported in the hopper in rotatable concentric relationship therewith wherein the flight of the screw is contoured with respect to the hopper in a manner to provide substantial space therebetween enabling compacted material in excess of that which will pass through the throat or inlet of the extruder to be discharged from the feeder screw in a bottom region of the hopper as a by-pass current passing upwardly within the hopper to re-enter a higher portion of the screw.

Accordingly, the flight comprises an upper section and a lower section joining and merging continuously about a turn or so above the bottom outlet or discharge opening of the hopper. While the pitch is preferably uniform throughout the length of the flight, the upper section has turns of larger diameter than the lower section, e.g., in a ratio of 1½ to 1. The two sections are connected by a tapering transitional turn or more of the upper section. The lower section extends through the outlet opening in close peripheral conformity therewith to dispose a major portion of the lower section below the opening. In a preferred embodiment, the feeder comprises a duct attached to the lower end of the hopper with a bore thereof in contiguous relationship with the opening and close peripheral relation with at least a portion of the length of the screw portion which extends below the opening.

The spacing of the hopper from the screw enables radial discharge of any portion of compacted material carried downwardly by the screw in excess of that which can be readily transmitted by the lower screw section to an extruder. The region provided around the screw by clearance with the hopper receives, at the level of the upper flight turn of the lower section, the over flow portion of compacted material which thereupon passes upwardly along the inner hopper surface as a portion of the circuit path by which it may re-enter the screw flight at an upper level of the feeder.

A preferred embodiment of the feeder includes structure that results in raised ridge surfaces extending primarily upwardly along the inner hopper surface to inhibit rotation of the feeder load with a screw.

In the drawing with respect to which the invention described:

Figure 1:
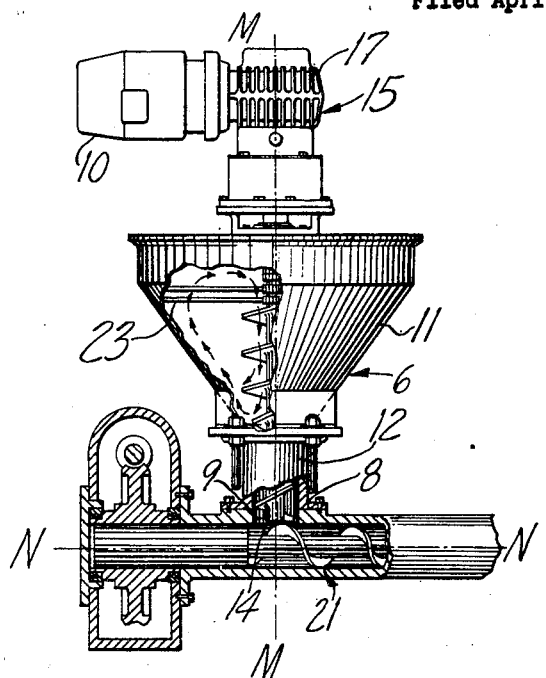
FIG. 1 is a fragmentary, partially sectioned elevation of a feeder with a hopper portion broken away, and a portion of an extruder.
Figure 2:
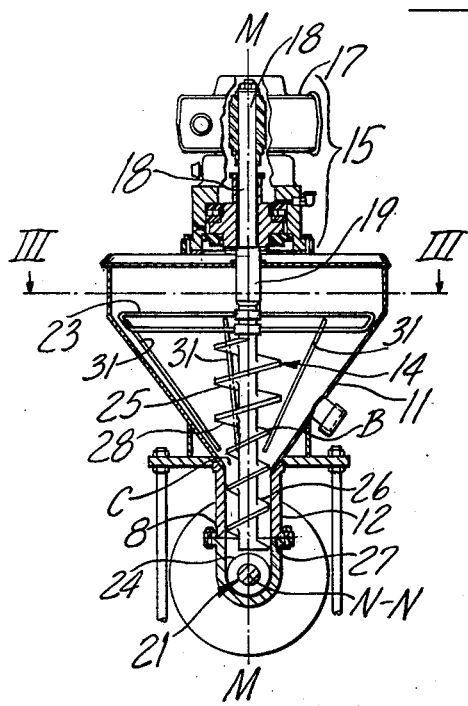
FIG. 2 is a fragmentary end view in partial section of the feeder and extruder illustrated in FIG. 1.

FIGS. 1 and 2 illustrate essential operating structure of a conventional extruder 5 and an extruder feeder 6 in accordance with this invention. The feeder 6 is supported atop feed inlet structure of the extruder defining a flat upper surface 8 and a throat 9 of the extruder. The feeder comprises a hopper 11, a lower throat duct 12, a screw member 14, and a driving means 15 connecting with a shaft extension 19 of the member. The driving means 15 may be of conventional construction comprising a motor 16 and a worm drive 17 culminating in a drive shaft 18 connecting with the shaft entension 19.

As shown, the hopper is generally frusto-conical or any shape symetrical with respect to a vertical axis M—M. This axis is also the axis of rotation for the screws member 14 and intersects a horizontal axis N—N of the extruder screw 21.

The screw member 14 has one continuous flight extending from a level in the hopper just under a loop-type stirrer 23 to the lower extremity of the member in close overhead proximity with the flight 24 of the extruder screw 21. The flight of the feeder member 14 comprises an upper section 25 which has several turns of uniform diameter somewhat larger than the turns of a lower section 26 which extends from about point B to the lower extremity of the member 14. As shown, the member 14 extends beyond the lower terminus 27 of the duct 12 into the throat 9 of the extruder. The flight turns of the lower section 26 conform closely to the peripheral diameter of the inner surface of the duct 12 throughout its length and extend at this the same diameter for a turn or two above the lower discharge opening of the hopper at level C. There is a small transition portion 28 of a flight turn of gradually decreasing radius for connecting the larger turns of section 25 to the turns of section 26.

An essential objective of this invention is to feed a comminuted thermoplastic scrap material into the extruder without causing clogging or jamming of the material in the feed hopper 6, and to assure uniform flow of the material into the throat of the extruder in a more efficient and reliable manner than attained in conventional extruders which process high-bulk feed materials. As structure conductive to these ends, the lower section 26 of the flight extends partially for a turn or two above the top of the duct 12 into the hopper. As the turns of section 26 are of uniform diameter and the frusto-conical wall of the hopper diverges upwardly away from the duct 12, a clearance zone within the lower portion of the hopper wall surrounding the upper turns of section 26 is formed in which any compacted comminuted material in excess of that capable being contained by the turns of section 26 and carried through the duct 12 to the extruder may be received. Any sustained feeding of material into this zone results in the substantially free upward movement thereof along the frusto-conical wall of the hopper if there is sufficient clearance between the upper flights of the screw member and the hopper wall.

The above described lower zone of the clearance region should measure approximately a couple inches or more for the escape of excess material from the upper turns of section 26.

As FIG. 2 clearly shows, the diameter of the upper section 25 and the hopper wall are so related that the region of clearance between the hopper wall and the screw member becomes progressively greater in radial area at progressively higher levels within the hopper. The material in excess of that which can be handled by section 26 circulates circuitly somewhat as indicated in the broken-away section of FIG. 1. That is to say, the diameter of the hopper wall increases at progressively higher levels with respect to corresponding diameters of the flight at the same levels as to cause progressive increases in the radial dimension of the clearance region between the wall and the screw member. At the higher levels within the hopper, the material passes more freely along the hopper wall because the greater clearance of the wall with the screw member. Such clearance may attain six or eight inches or more depending on the size of equipment used.

There will be at least a small circular component in the movement of the recirculated material in the direction of rotation of the screw member in addition to the vertically circuit path shown in FIG 1. This component becomes easily greater than permissible with smooth hopper surfaces. Such rotation of the hopper load is minimized in the present invention by provision of any means which will produce a raised ridged surface extending primarily in the upward-downward direction of the hopper wall. Preferably there are several of such ridged surfaces spaced uniformly along the circumference of the hopper.

Figure 3:
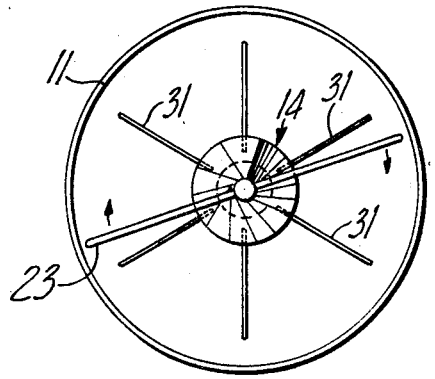
FIG. 3 is a plan view in section as viewed along line III—III of FIG. 2.

Such ridged surfaces have been attained, for example, by welding appropriate lengths of one-half inch steel rod along the inner surface of the hopper wall in the manner shown in FIGS. 1, 2 and 3 wherein rod lengths of ribs 31 are shown extending from a lower portion of the hopper on a level with an upper turn of the lower screw section 26 in an essentially radial and upward direction to an upward level opposite an upper portion of the screw member. However, the ridged surfaces may be obtained by other structures such as by short lengths of angle iron or T iron secured to the inner hopper surface and corrugations in the hopper wall.

Figure 4:
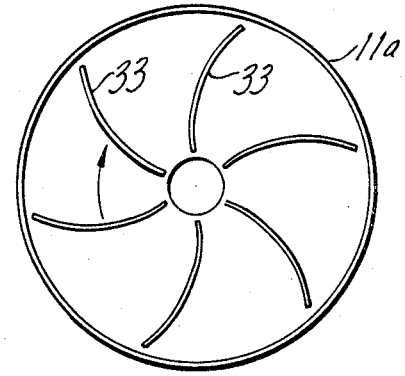
FIGS. 4 and 5 are plan and elevation views, respectively, in section of a modified hopper.
Figure 5:
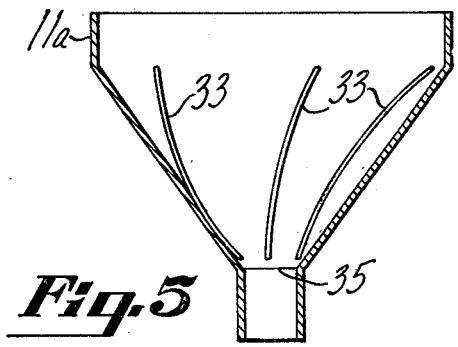

FIGS. 4 and 5 illustrate the hopper 11a provided with the ribs 33 formed, e.g., of rod stock as described with respect to hopper 11 and ribs 31. The ribs 33 extend radially and upward along the inner hopper surface in canted relation with a radial plane containing the vertical axis of the hopper. As shown, the ribs extend in a somewhat spiral path by extending essentially upward in a radial plane at their lowest level 35 and then curving in a circumferential direction in agreement with the direction screw rotation as indicated in FIG. 4. An object of such rib construction is to induce circuitous bottom-to-top-to-bottom currents throughout the hopper as illustrated in FIG. 1 when the upper screw section 25 delivers more material than section 26 can pass to the extruder. Such induction of vertical currents is promoted in the embodiment of FIGS. 4 and 5 at the expense of permitting some circumferential movement of the load under such control as provided by the cant or spiral direction of the ribs upwardly in the direction of rotation of the screw member. The essential condition in achieving this effect is that the ribs or other ridged surfaces lean or incline relative to lower extremities away from a radial plan containing the axis of the screw member in the direction of rotation of the member. The ribs 33 may thus be curved or canted relative to the inner hopper surface to the extent needed to obtain the degree of recirculation control of the hopper load desired.

What is claimed is:

1. A feeder for an auger-type plastic extruder comprising:
   a hopper having a funnel-shaped wall tapering downwardly to a central outlet opening;
   a lower throat duct fixed to the lower end of the wall having a cylindrical bore in coaxial continguous relation with said opening;
   a screw member comprising a continuous flight supported within said wall and the duct in rotatable coaxial relation therewith; said flight having an upper section and a lower section, the upper section having turns which are larger than those of the lower section to accomplish compacting of particulate material and forwarding thereof into the lower section, the turns of the lower section being of generally uniform diameter and extending upwardly approximately one turn or more from said opening into the hopper with the remainder of the lower section extending downwardly through said opening and said bore at close clearance with the periphery thereof;
   said lower section being disposed partially above said opening to form a clearance zone between the lower portion of the hopper wall and the portion of the lower section extending therein for receiving any of said material in excess of that passable by said lower section through said opening and more; the diameters of said upper section and said wall being related to define a region of clearance including said clearance zone which becomes progressively greater in radial area at progressively higher levels within the hopper to facilitate passage of said excess material upwardly through said region.

2. The feeder of claim 1 wherein the diameter of the hopper wall increases at progressively higher levels with respect to corresponding diameters of the flight at the same levels as to cause progressive increases in said dimension of said region.

3. The feeder of claim 1 comprising ridge means fixed along the inner surface of the hopper at clearance with the periphery of the flight throughout the region swept by said member while rotating, said rigid means extending primarily in an upward-downward direction through substantially the height of that portion of the member within the hopper.

4. The feeder of claim 3 wherein the ridge means forms a plurality of relatively spaced ridges along a circumference of the hopper.

5. The feeder of claim 3 wherein the ridge means forms a plurality of ridges spaced uniformly along a circumference of the hopper, each ridge extending upwardly at an inclination relative to a radial plane containing said axis of rotation and intersecting a lower portion of a ridge.

6. The feeder of claim 1 wherein a plurality of the turns of the upper section are of generally uniform flight diameter and larger than the turns of the lower section by a diameter ratio approximately 1.5 to 1.

7. The feeder of claim 1 wherein the diameter of the hooper exceeds the flight diameter of the upper section and said turn of the lower section at any corresponding level to a magnitude providing space for free upward passage of the material carried by the upper section to the lower section in excess of that portion which can be carried by the lower section.

References Cited

UNITED STATES PATENTS

| | | |
|---|---|---|
| 2,933,175 | 4/1960 | Gray. |
| 3,047,034 | 7/1962 | Sassmannshausen et al. |
| 3,177,527 | 4/1965 | Nelson. |
| 3,183,553 | 5/1965 | Slater. |
| 3,310,617 | 3/1967 | Dygryt et al. |

FOREIGN PATENTS

| | | |
|---|---|---|
| 828,361 | 2/1960 | Great Britain. |

WILLIAM J. STEPHENSON, Primary Examiner

PO-1050
(5/69)

UNITED STATES PATENT OFFICE
CERTIFICATE OF CORRECTION

Patent No. 3,496,601        Dated February 24, 1970

Inventor(s) Paul McGill

It is certified that error appears in the above-identified patent and that said Letters Patent are hereby corrected as shown below:

Column 2, line 51, change "screws" to -- screw --.

Column 3, line 8, change "conductive" to -- conducive --.

Column 4, line 27, change "continguous" to -- contiguous --; line 48, change "more" to -- bore --.

Column 5, line 6, change "hooper" to -- hopper --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents